United States Patent
Li et al.

(10) Patent No.: US 10,110,661 B2
(45) Date of Patent: Oct. 23, 2018

(54) SERVER SIDE PREPROCESSING OF WEB CONTENT

(71) Applicant: Verizon Patent and Licensing Inc., Arlington, VA (US)

(72) Inventors: Minbao Li, Lewisville, TX (US); Amit Singh, Basking Ridge, NJ (US); Kaushal K Shah, Parsippany, NJ (US); Pugazh Thyagarasan, Edison, NJ (US); Bharadwaja Cheruvu, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 115 days.

(21) Appl. No.: 14/872,442

(22) Filed: Oct. 1, 2015

(65) Prior Publication Data

US 2017/0099340 A1    Apr. 6, 2017

(51) Int. Cl.
*H04L 29/08* (2006.01)

(52) U.S. Cl.
CPC .............. *H04L 67/06* (2013.01); *H04L 67/02* (2013.01); *H04L 67/28* (2013.01)

(58) Field of Classification Search
CPC .......... H04L 67/02; H04L 67/06; H04L 67/28
See application file for complete search history.

(56) References Cited

U.S. PATENT DOCUMENTS

| | | | | |
|---|---|---|---|---|
| 6,085,226 A * | 7/2000 | Horvitz | ............. | G06F 17/30902 707/E17.12 |
| 2008/0222268 A1* | 9/2008 | Miyamoto | .............. | H04L 67/02 709/217 |
| 2008/0249991 A1* | 10/2008 | Valz | .................. | G06F 17/30867 |
| 2015/0371142 A1* | 12/2015 | Jain | ................... | G06F 17/30902 706/52 |
| 2016/0306895 A1* | 10/2016 | Kaewell | ............ | G06F 17/30902 |

* cited by examiner

*Primary Examiner* — Brian J Gillis
*Assistant Examiner* — Gil H. Lee (57) ABSTRACT

Techniques described herein may be used to expeditiously provide web content to user devices. A web server may provide a first webpage to a user device. Prior to the user device requesting another webpage (e.g., while the user of the user device is viewing the first webpage), the server device may identify a second webpage that the user device is likely to request next and obtain content corresponding to the second webpage. The web server may receive a request for the second webpage, and in response to the request, may provide the second webpage, along with the content, to the user device. The content may include information that is not typically cached by the web server. Additionally, the web server may verify that there are adequate system resources available (e.g., processing capacity, memory capacity, etc.) prior to obtaining the content.

20 Claims, 8 Drawing Sheets

SERVER SIDE PREPROCESSING OF WEB CONTENT

BACKGROUND

Accessing web content (e.g., a webpage) may involve a web server providing webpages to a user device (e.g., a personal computer, a smartphone, etc.) that may be viewed in a browser. Some webpages may include the same information regardless of, for example, the user accessing the webpage. Other webpages may include information that is more personalized to the user or user device accessing the webpage. An example of a webpage that may include the same information regardless of the user may include the home page of a website, whereas an example a webpage that is more personalized may include a webpage that displays the user profile information of a particular user. Webpages that provide personalized typically require additional and/or customized processing by the web server.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As mentioned above, web servers may provide information, to user devices, that is presented as a webpage within a browser. Some webpages may include standardized information that is the same regardless of the user or user device requesting the webpage. Other webpages may include personalized information that depends on the user or user device that is accessing the webpage. In scenarios where the information is standardized, the web servers may implement caching techniques to speed up the process of providing webpages to a user devices. However, when the webpage includes personalized information, the web server may be unable to use caching techniques because the webpage requires personalized information. As such, webpages with personalized information may take longer for a user to access because the web server may need to obtain or create the webpage content on-demand. This delay may be even longer when the web server has to contact external servers (e.g., advertising servers, content servers, etc.) in order to collect all of the information that will be presented in the personalized webpage.

Techniques described herein may be used to enable a web server to expedite the process of providing personalized webpage information to a user device. For instance, a web server may provide a first webpage to a user device. While the user is viewing the first webpage, the web server may identify one or more other webpages that the user is likely to request next, and may proceed to preprocess the webpages before the user makes such a request. Preprocessing a webpage may include identifying and obtaining information required for the webpage (which may include evaluating information received from the user, retrieving user-specific information from external servers, and storing the information in a local memory). As such, when the user is done viewing the first web page and makes a request for the preprocessed webpage, the web server may provide the webpage to the user promptly as the web server has already obtained some or all of the personalized information that will go into the preprocessed webpage. As such, techniques described herein may enable a web server to provide personalized webpages to user devices in a more expeditious manner by identifying the webpage that the user will likely request next and obtaining the information that will go into the webpage prior to the user requesting the webpage.

Figure 1:
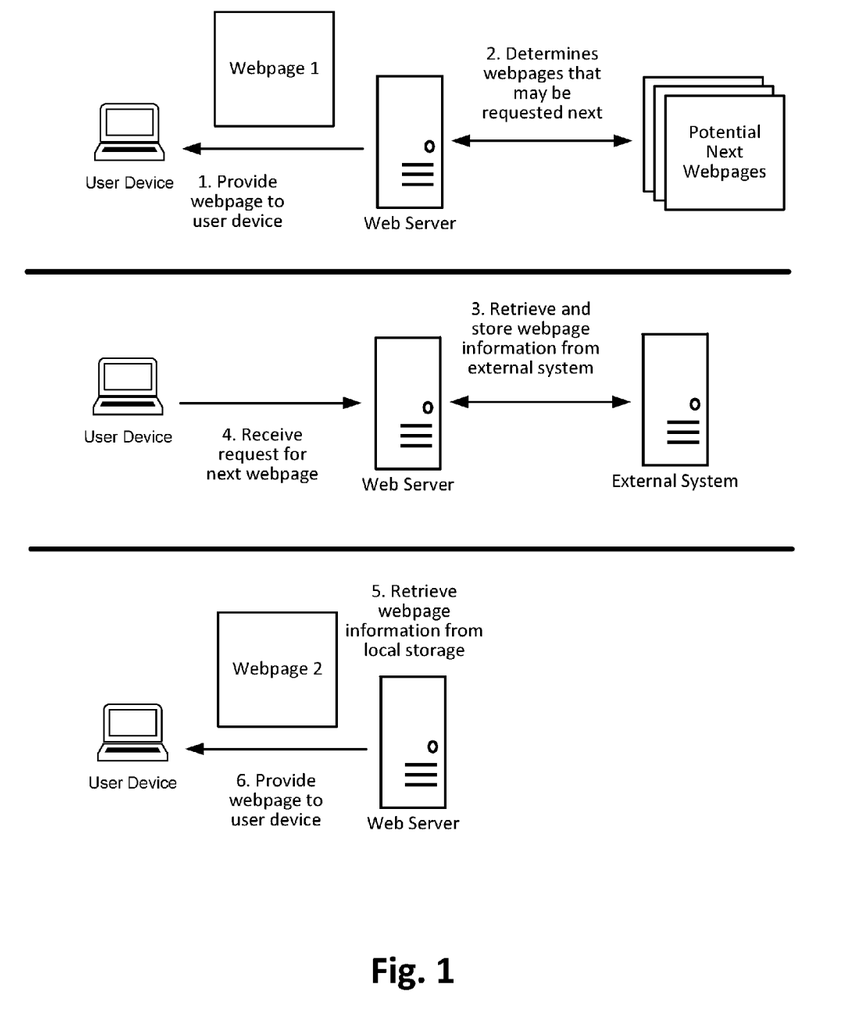
FIG. 1 is an example overview of an implementation described herein.

FIG. 1 illustrates an example overview of an implementation described herein. As shown in FIG. 1, a web server may provide a webpage (Webpage 1) to a user device (at 1). The web server may then determine other webpages that the user device is likely to request next (at 2). In some implementations, this determination may be based on a variety of factors, such as the browsing patterns of the user, the browsing patterns of similar users, the relevancy of the current webpage (Webpage 1) with webpages that the user could request next, etc.

The web server may determine whether each webpage should be cached, preprocessed, or neither based on, for example, the likelihood that the webpage will be requested next and/or the nature of the content included in the webpage. For instance, if a webpage is likely to be requested and primarily includes standardized information that is the same or similar regardless of the user requesting the webpage, the scenario in which the webpage is requested, the time that the webpage is requested, etc., the web server may determine that the webpage is suited for caching. By contrast, if a webpage is likely to be requested and includes information that is unique or specifically tailored to the user requesting the webpage, the scenario in which the webpage is being requested, the time that the webpage is requested, etc., the web server may determine that the webpage is suited for preprocessing. If a webpage is not likely to be requested next, the web server may decide that the webpage will neither be cached nor preprocessed. Caching a webpage may include storing the webpage in a local cache memory for a relatively long period of time since the standardized information in cached webpage may be reused for webpage requests at other times and/or from other users. Preprocessing a webpage, on the other hand, may include storing the webpage in a local memory for a shorter period of time since the information in a preprocessed webpage may tend to be usable for a particular user, for a particular scenario, at a particular time, etc. In some implementations, the web server may verify whether a webpage has already been cached prior to preprocessing the web page. For instance, the web server may verify that the information of a webpage is sufficiently unique so as not to be cached.

The web server may communicate with external systems (e.g., advertising servers, inventory servers, user information servers, transaction servers, etc.) to retrieve and store the information that would be required by the webpages identified as being likely to be requested next (at 3). At some point, the web server may receive a request for another webpage (at 4). The web server may prepare the requested webpage using the webpage information that was retrieved from the external systems and was stored by the web server (at 5). The web server may provide the requested webpage (Webpage 2) to the user device (at 6).

In some implementations, whether the web server preprocesses webpages, as described above, may depend on whether there are sufficient system resources (e.g., processing capacity, memory capacity, etc.) available to allocate to preprocessing webpages. As such, prior to preprocessing webpages as described above, the web server may first verify that there are adequate system resources available to do so. Additionally, the web server may implement one or more evaluation techniques for determining how likely it is for a particular webpage to be requested next. Similarly, the web server may implement various techniques for determining whether a subsequent request for a particular webpage is sufficiently likely to justify the web server preprocessing the webpage. As such, in addition to providing a solution to expeditiously providing personalized webpages to a user device, the web server may do so in a manner that balances the availability of system resources with the likelihood that a particular webpage will actually be requested by the user device.

Figure 2:
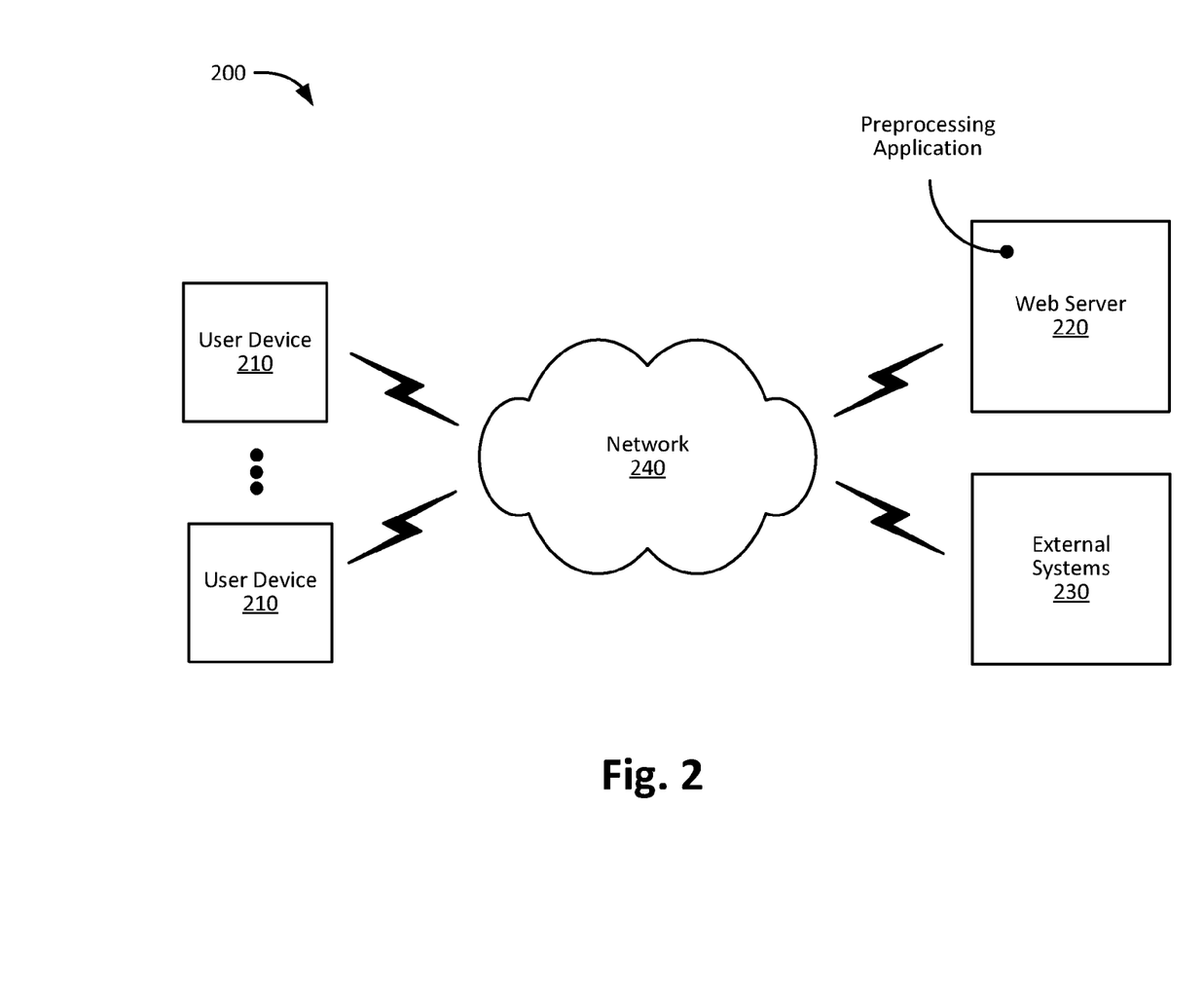
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, web server 220, external systems 230, and network 240.

User device 210 may include a portable computing and communication device, such as a personal digital assistant (PDA), a smart phone, a cellular phone, a laptop computer with connectivity to a cellular wireless network, a tablet computer, etc. User device 210 may also include non-portable computing devices, such as a desktop computer, a consumer or business appliance, or other devices that have the ability to connect to network 240. User device 210 may also include a computing and communication device that may be worn by a user (also referred to as wearable devices) as a watch, a fitness band, a neckless, glasses, an eyeglass, a ring, a belt, a headset, or another type of wearable device. As depicted, user device 210 may include software, such as a browser, that may enable user device 210 to display webpages received from web server 220.

Web server 220 may include one or more computing devices, such as a server device or a collection of server devices, capable of providing webpages to user device 210. As shown, web server 220 may include preprocessing application 225, which may enable web server 220 to perform one or more of the operations described herein. For instance, web server 220 may be capable of determining webpages that user device 210 is likely to request and preprocessing the webpages. Preprocessing a webpage may include obtaining information (e.g., from external systems 230) that will go into the webpage prior to the webpage being requested by user device 210. As such, when a request for the webpage is received from user device 210, web server 220 may provide the webpage to user device 210 using the locally stored webpage information. Web server 220 may also implement one or more policies or techniques for determining whether there are adequate system resources for preprocessing webpages, how likely a particular webpage is to be requested next, and whether a particular webpage is sufficiently likely to be requested next to justify preprocessing.

External systems 230 may include one or more computing devices, such as a server device or a collection of server devices, capable of providing webpage information to web server 220. As mentioned above, webpage information may include any type of information that may be presented in a webpage. For instance, if a webpage dedicated to selling car insurance policies, then webpage information for that webpage may include a list of car insurance policies, policy providers, policy terms and conditions, policy rates, etc. In some implementations, the webpage information may be personalized or tailored according to the user of user device 210. For instance, continuing with the car insurance example, the webpage information could include car insurance policies that are tailored to the age, vehicle, and driving record of the user of user device 210. As such, external system 230 may be capable of providing web server 220 with personalized webpage information in response to requests from web server 220 for such information.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
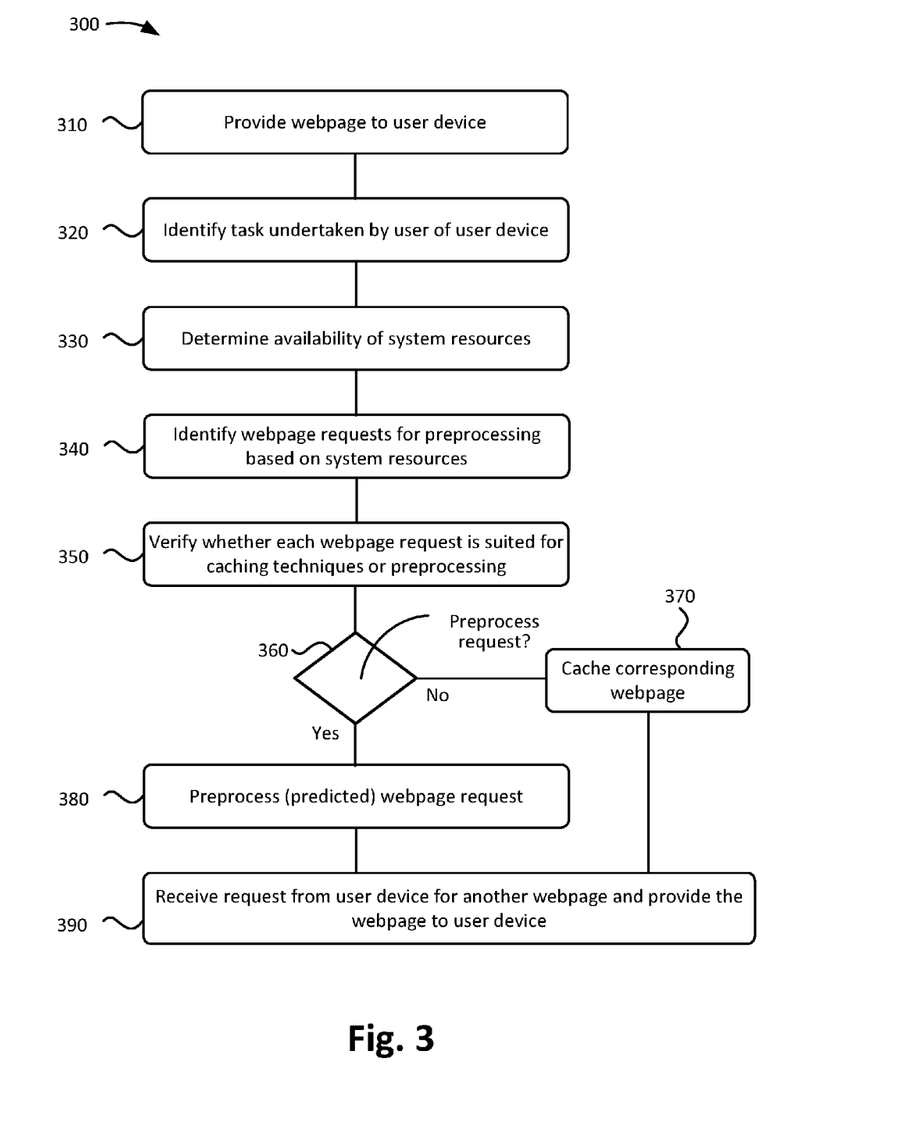
FIG. 3 is a flowchart diagram of an example process for providing a preprocessed webpage to a user device.

FIG. 3 is a flowchart diagram of an example process 300 for providing a preprocessed webpage to user device 210. In some implementations, process 300 may be implemented by web server 220 (e.g., by parallel preprocessing application 225).

As shown, process 300 may include providing a webpage to user device 210 (block 310). For instance, web server 220 may receive a request from user device 220 for a particular webpage and may respond to the request by providing the requested webpage to user device 210. In some implementations, the webpage may include information that is specific to a user of user device 210. For instance, the webpage may include a product that the user is thinking of buying. The webpage may include features that have been requested by the user (color, size, weight, quantity, etc.), purchase information submitted by the user, delivery information submitted by the user, etc. In another example, the webpage may include a list and summary of bank accounts that the user has with a banking institution. In yet another example, the webpage may include a user profile page of an online service, such as a social networking service, an email service, a content delivery service, etc. As such, the webpage may be part of a website that may provide the user with a series of webpages that include information that is personalized by and/or for the user of user device 210.

Process 300 may include identifying a task undertaken by a user of user device 210 (block 320). Examples of a task undertaken by a user may include online banking, shopping online, conducting research, checking an email account, managing a blog or personal website, etc. In some implementations, web server 220 may determine a task that a user appears to have engaged in based on one or more factors, such as the webpage (and content) currently being viewed by the user, a sequence of webpages recently viewed by the user, historical browsing patterns and activity of the user, historical browsing patterns and activity of similar users, whether the webpage currently viewed by the user is part of an established sequence of webpage associated with a known activity (e.g., applying for a job), etc.

In some implementations, the task undertaken by the user may require webpages that include content that is unique to the particular task. As discussed herein, content may be unique to a particular task when the content is so unlikely to be requested by user devices 210 that using standard caching techniques would be a waste of the system resources web server 220. For instance, if the user is shopping online and has selected a group of seemingly unrelated products for purchase, the unique content for the task may include profile information of the user (e.g., name, address, telephone number, etc.), the particular collection of products, specific discounts that are available to the user, a shopping history of the user, etc. While such content may not be utterly unique to web server 220, the content is requested on such a rare basis as to not be cached by web server 220 as a matter of course. As such, from the perspective of web server 220, the content is unique to the instance of the task being undertaken by the user.

Process 300 may include determining available system resources for preprocessing webpages (block 330). For example, web server 220 may determine how much of the system resources of web server 220 are currently in use and whether there are enough system resources available to preprocess webpages. System resources may include processing capacity, data storage capacity (e.g., memory), bandwidth, etc. In some implementations, when system resources are readily available, web server 220 may preprocess webpages for many predicted situations and scenarios, whereas when system resources are very limited, web server 220 may only preprocess webpages in certain scenarios (e.g., when a webpage is highly likely to be requested), or not at all. As described in more detail with reference to FIG. 7, web server 220 may implement one or more policies and/or thresholds for determining whether there are enough system resources available for preprocessing a webpage.

Process 300 may include identifying webpage requests for preprocessing based on system resources (block 340). For example, web server 220 may determine all the webpages that may be requested by user device 210 next, the likelihood that each webpage will be requested next, and determine how many webpage requests should be preprocessed based on the likelihood of each webpage being requested and the available system resources. In some implementations, all the webpage requests that may be requested next by user device 210 may include the webpage requests that correspond to the possible combinations of user input data (e.g., button selections, selections from drop-down lists, selected hyperlinks, etc.) that may submitted, by the user, to cause the dynamic generation of a webpage. Additionally, web server 220 may consider one or more factors in determining the likelihood of a particular combination of input data (resulting in a particular webpage request) being requested next. Examples of such factors may include the browsing patterns of the user, the browsing patterns of similar users, the relevancy of a webpage that could be requested next to the webpage that the user is currently viewing, etc. FIGS. 5-8 provide additional details and examples of identifying webpages for preprocessing based on the availability of system resources.

Process 300 may include verifying whether each webpage request is suited for caching techniques or preprocessing (block 350). For instance, web server 220 may implement standardized caching techniques for webpages that include the same, or similar, information regardless of, for example, the user requesting the webpage, the scenario in which the webpage is requested, the specific task being undertaken by the user, etc. By contrast, web server 220 may reserve preprocessing for webpages that require information that is specific or unique to the user requesting the information, the scenario in which the webpage is requested, the specific task (or instance of the specific task) being undertaken by the user, etc. Since preprocessing a webpage may include operations that are more resource intensive and far less likely to be reusable for a request from another user, differentiating between webpages that should be cached or preprocessed may, for example, enable web server 220 to allocate system resources more judiciously by apply a stricter standard (e.g., requiring high higher likelihood of actually being requested) to webpages that are to be preprocessed.

If a particular webpage is not to be preprocessed (block 360—No), process 300 may include caching the corresponding webpage using standard caching techniques (block 370). In some implementations, since webpage that are cached often include webpages the standardized information, when a webpage is to be cached, web server 220 may verify that the webpage has not already been cached as the result of another process. By contrast, if a particular webpage is to be preprocessed (block 360—Yes), process 300 may include preprocessing the webpage (block 380).

Process 300 may include preprocessing the (predicted) webpage requests (block 380). For example, web server 220 may preprocess webpages that are likely to be requested by user device 210 by identifying information that will be required by the webpages, determining the source of the information, obtaining the information, and storing the information locally. For instance, if a webpage that is likely to be requested by user device 210 next includes the credit card information that the user will use to pay for a movie content service, web server 220 may identify a transactions server (e.g., external system 230) that includes the credit card information and communicate with the transactions server to retrieve the credit card information.

The credit card information may then be stored locally by web server 220 until the corresponding webpage is actually requested by user device 210. In another example, if a webpage that is likely to be requested by user device 210 next includes a list of peripheral devices that the user may want to purchase (along with a laptop computer that the user is about to purchase), web server 220 may identify a products server (e.g., external system 230) that includes the list of peripheral devices and may communicate with the products server to obtain the list. The list of peripheral devices may then be stored locally by web server 220 until the corresponding webpage is actually requested by user device 210. The list of peripheral devices may be a list that is specific to the type of laptop being purchased by the user (as opposed to, for example, a list of peripheral devices that are provided to any user purchasing any device from the website).

In some implementations, web server 220 may preprocess a webpage by obtaining some of the information required by the webpage and store the information as a standalone data set (to be inserted into a webpage requested by user device 210 next) or as a completed copy of the webpage (to be completed later, such as upon request for the webpage from user device 210). In some implementations, web server 220 may preprocess a webpage by obtaining all the information required by the webpage, producing a copy of the entire webpage, and storing the copy of the webpage for later use. As such, web server 220 may preprocess a webpage by obtaining only a portion of the data that will be presented in the webpage or by generating the entire webpage.

Process 300 may include receiving a request from user device 210 for another webpage and provide the webpage to user device 210 (block 390). For example, web server 220 may receive a request from user device 210 for a webpage. Web server 220 may determine whether the requested webpage corresponds to a preprocessed webpage, a cached webpage, or neither. When the request corresponds to a preprocessed webpage, web server 220 may identify the locally stored information that web server 220 retrieved from external system 230 and provide the information as part of the webpage requested by user device 210. When the request corresponds to a cached webpage, web server 220 may retrieve the webpage from cache memory and provide the webpage to user device 210. And, when the requested webpage does not correspond to a preprocessed webpage or a cached webpage, web server 220 may generate the process normally (e.g., by generating the webpage on demand).

Figure 4:
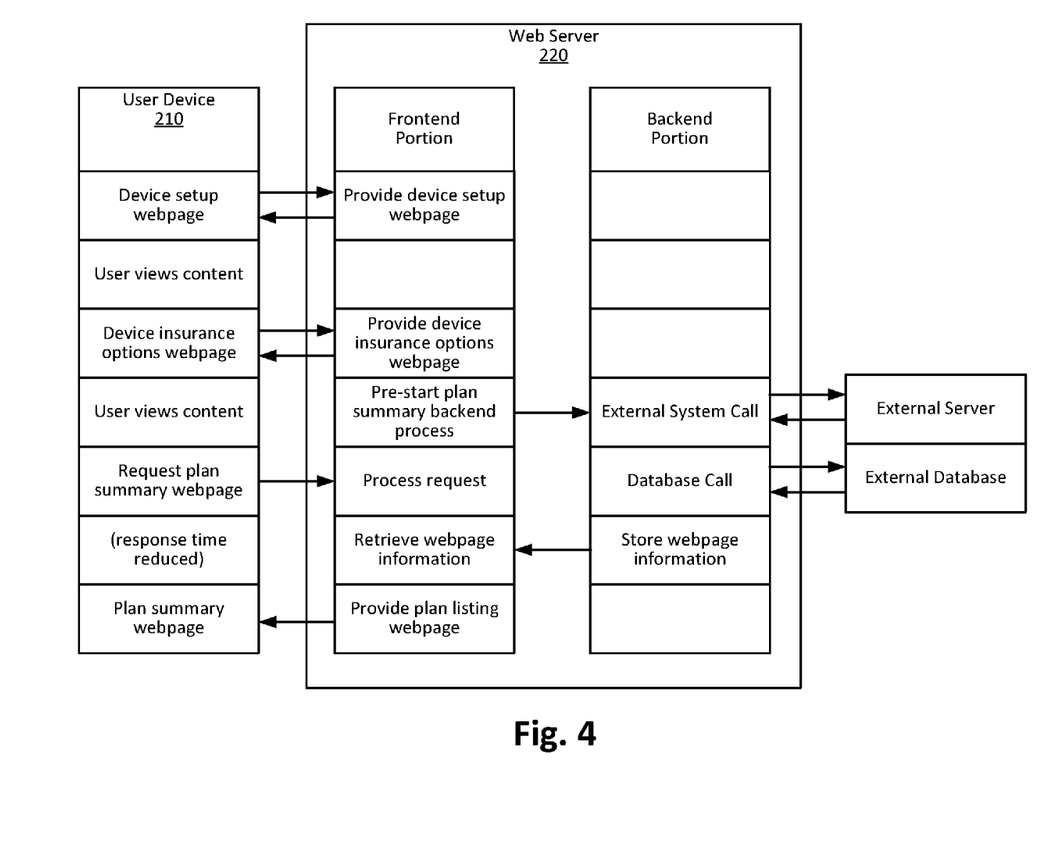
FIG. 4 is a data flow diagram of an example of providing a preprocessed webpage to user device.

FIG. 4 is a data flow diagram of an example of providing a preprocessed webpage to user device 210. As illustrated, web server 220 may include a frontend portion and a backend portion. In some implementations, the frontend portion and the backend portion may be implemented in one server device. In some implementations, the frontend portion and the backend portion may be implemented using multiple server devices.

In the example of FIG. 4, assume that a user is ordering an electronic device (e.g., a smartphone) that comes with an insurance plan with various options (e.g., coverage duration, coverage amount, etc.). As such, the frontend portion of web server 220 may provide a device setup webpage to user device 210. The device setup webpage may enable the user to register the device for one or more services, such as telephone calls, text messages, Internet access, etc. As shown, the user may view the content of the device setup webpage and, for example, select the services that he or she would like to receive. When the user is finished with the device setup webpage, the frontend portion of web server 220 may provide user device 210 with a device insurance options webpage. The device insurance options webpage may enable the user to view various options for insuring the device against water damage, accidental damage, etc.

While the user views the content of the device insurance options webpage, the frontend portion of web server 220 may determine that the next webpage that the user is likely to request is a plan summary webpage. The plan summary webpage may enable the user to, for example, view a summary of the new device, the services for the new device, and the insurance plan for the new device. As such, the frontend portion of web server 220 may pre-start a backend process for obtaining the information that may be required by the plan summary webpage. In response, the backend portion of web server 220 may communicate with one or more external systems 230 (e.g., an external server, an external database, etc.) to obtain the information for the plan summary webpage. While the backend portion of web server 220 is retrieving the required information, user device 210 may communicate a request for the plan summary webpage to the frontend portion of web server 220. In response, and since the backend portion of web server 220 had already retrieved the information for the plan summary webpage, the frontend portion of web server 220 may retrieve the results of the backend process and provide the plan summary webpage to user device 210. Accordingly, a frontend portion and a backend portion of web server 220 may cooperate to provide user device 210 with webpages in a more expeditious manner.

As described above, web server 220 may preprocess a webpage (or webpage content) that is likely to be requested by user device 210 next. In some implementations, web server 220 may also preprocess webpages that are likely to be requested after the webpage that will likely be requested next. For instance, if the user of user device 210 is currently viewing a first webpage, as described above, web server 210 may preprocess a webpage (i.e., a second webpage) that the user will likely request next. In some implementations, prior to the second webpage being requested, web server 210 may preprocess a third webpage, a fourth webpage, etc., based on the likelihood that the user will ultimately request each webpage.

Additionally, each time a webpage is requested by user device 210, web server 220 may reevaluate whether to continue storing the content for each preprocessed webpage. To continue with the example provided above, once the user requests another webpage, web server 220 may reevaluate the likelihood that the third webpage and the fourth webpage will be requested next, regardless of whether the user did, in fact, request the second webpage as predicted. As such, if (for example) web server 220 determines that it is still likely that the user will request the third webpage next but not the fourth webpage thereafter, web server 220 may continue to store the content for the third webpage, but delete the content for the fourth webpage.

In some implementations, the webpage content may be specific to a user and/or a user device. For instance, the webpage content may vary based on the type of mobile device accessing the webpages, the display features and capabilities of the mobile device, the software installed on the mobile device, etc. In some implementations, the webpage content may also be specific to user information that is associated with the user of user device 210.

Figure 5:
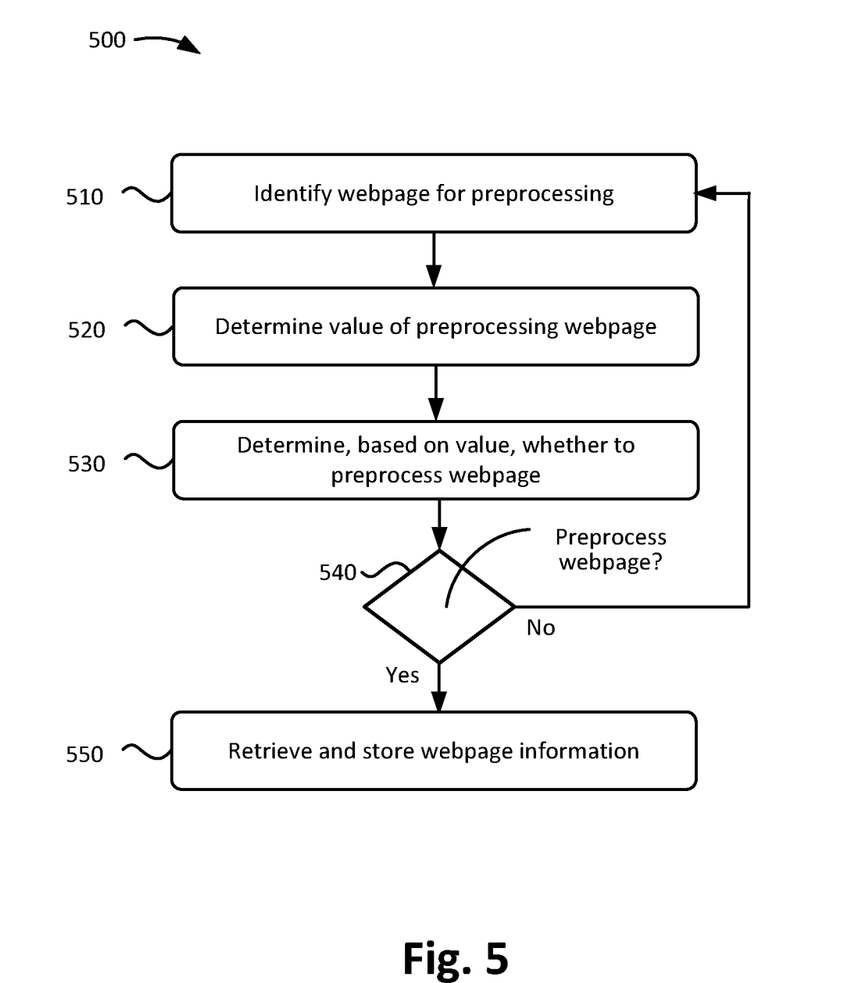
FIG. 5 is a flowchart diagram of an example process for determining whether to preprocess a webpage.

FIG. 5 is a flowchart diagram of an example process 500 for determining whether to preprocess a webpage. In some implementations, process 300 may be implemented by web server 220 (e.g., by parallel preprocessing application 225).

As shown, process 500 may include identifying a webpage for preprocessing (block 510). For instance, web server 220 may have provided user device 210 with a webpage, and web server 220 may identify one or more webpages that the user may want to access next. In some implementations, web server 220 may identify the potential webpages based on buttons or hyperlinks in the webpage that has been provided to user device 210.

Figure 6:
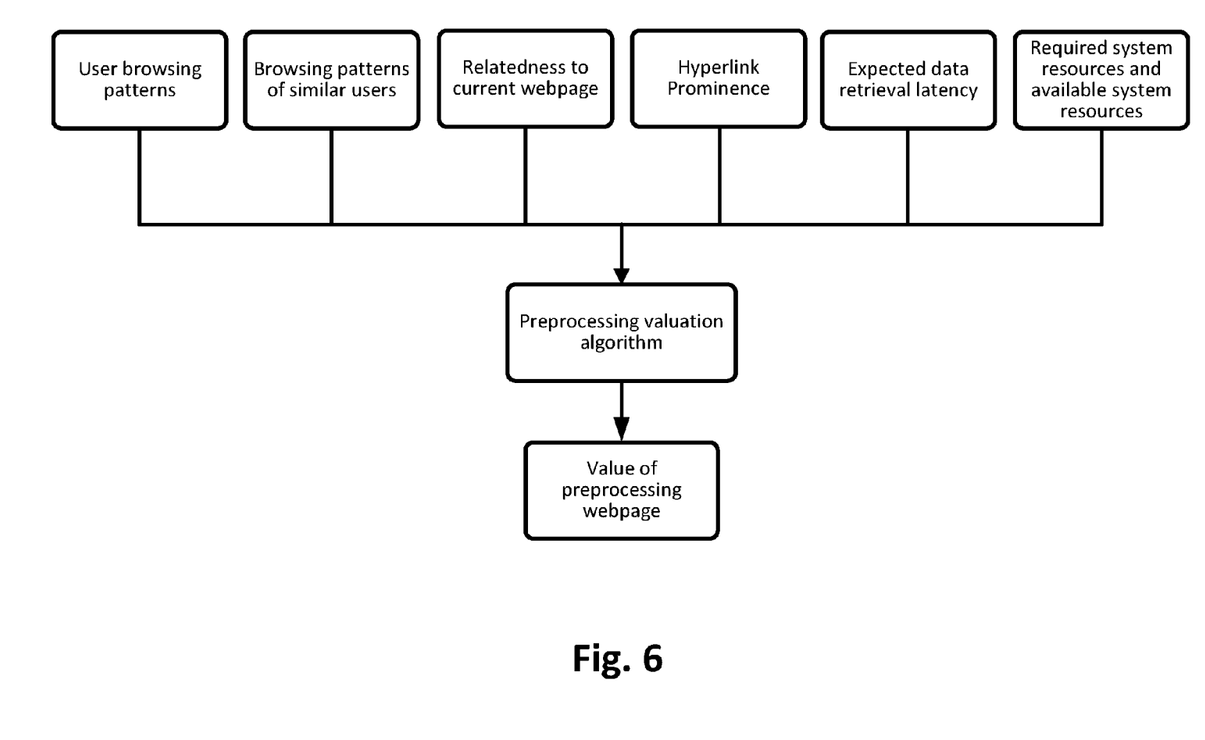
FIG. 6 is a logical flow diagram of an example implementation for determining the value of preprocessing a webpage.

Process 500 may include determining the value of preprocessing the webpage (block 520). For example, web server 220 may determine the value of preprocessing a particular webpage. The value of preprocessing a webpage may include a numerical value that represents the benefit (in terms of system performance) of preprocessing the webpage. The benefit of preprocessing a webpage may be based on a variety of factors, such as the likelihood that the webpage will be the next webpage requested by user device 210. Another factor may include the availability of system resources for preprocessing the webpage. For instance, if system resources are scarce, the value of preprocessing a webpage may be decreased because the cost (in terms of system resources) may be relatively high; however, if system resources are abundant, the value of preprocessing the webpage may be increased because the cost (in terms of system resources) of preprocessing the webpage may be relatively low. FIG. 6 provides examples of various factors that web server 220 may take into consideration when determining the value of preprocessing a webpage.

Figure 7:
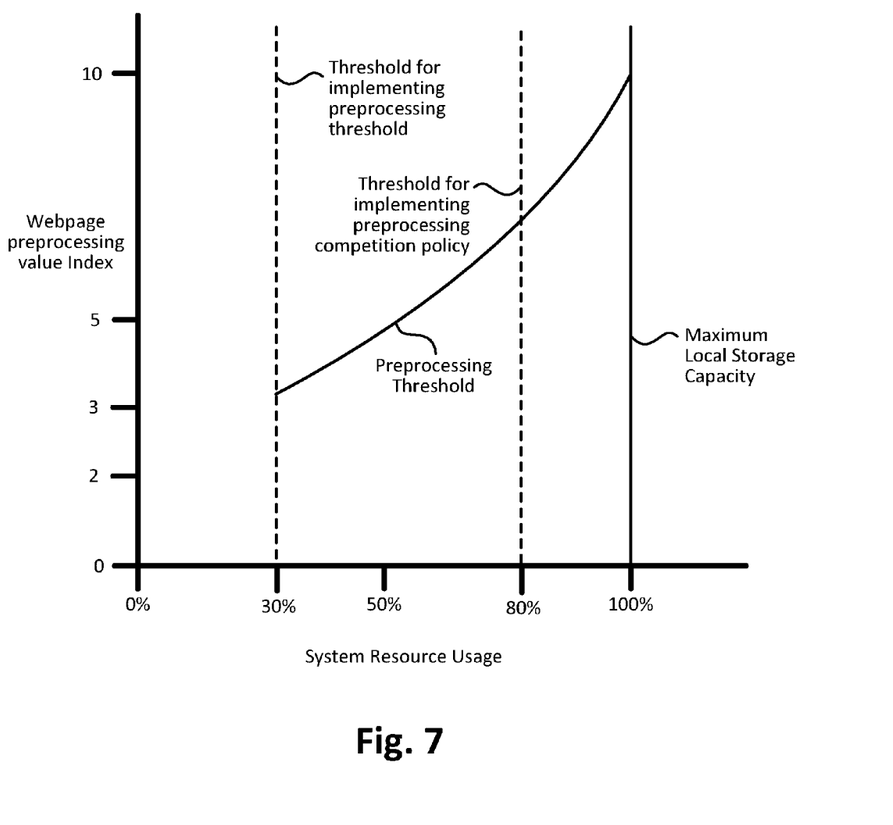
FIG. 7 is a diagram of a table representing example rules, thresholds, and conditions for determining whether to preprocess a webpage.

Process 500 may include determining, based on the value, whether to preprocess the webpage (block 530). For example, web server 220 may determine whether to actually preprocess a particular webpage based on the determined value of doing so. In some implementations, web server 220 may implement one or more rules, thresholds, or policies in determining whether to preprocess a webpage. FIG. 7 provides an example of how web server 220 may decide whether to preprocess a webpage based on the value of the webpage.

If the webpage is not to be preprocessed (block 540—No), process 500 may include identify another potential webpage for preprocessing (block 510). However, if the webpage is to be preprocessed (block 540—Yes), web server 220 may proceed by retrieving and storing webpage information for the webpage (block 550). For instance, web server 220 may identify information that will be required by the webpage, retrieve the webpage information (e.g., from external system 230), and store the webpage information locally. As such, web server 220 may have the webpage information readily available (i.e., preprocessed) in the event that user device 210 does, in fact, request the webpage.

FIG. 6 is a logical flow diagram of an example implementation for determine the value of preprocessing a webpage. In some implementations, the information and operations represented by the logical flow diagram of FIG. 6 may be implemented by web server 220 (e.g., by parallel preprocessing application 225).

As shown, web server 220 may use several types of information when determining the value of preprocessing a webpage. Examples of such information include user browsing patterns, browsing patterns of similar users, the relatedness to the current webpage (being viewed by the user), hyperlink prominence, expected data retrieval latency, and required system resources and available system resources. In some implementations, additional information, alternative information, or less information may be used by web server 220 to determine the value of preprocessing a webpage.

User browsing patterns may include historical browsing behaviors of the user of user device 210. For instance, if the webpage being currently viewed by a user includes a summary of bank accounts owned by the user, and historically the user requests the details of a particular account after viewing the summary of bank accounts, web server 220 may determine that the next webpage that the user will request will likely be the webpage that provides the details of the particular account. As such, web server 220 may consider user browsing patterns when determining the likelihood that a particular webpage will be the next webpage that will be requested by user device 210.

Browsing patterns of similar users may include historical browsing behaviors of users that are similar to the user of user device 210. For example, if the webpage being currently viewed by a user includes a product summary of a product that the user is considering for purchase, and other users that viewed the product summary of the product often selected a hyperlink to the product details of the product, web server 220 may determine that the next webpage that the user will request the webpage that provides the product details of the product. As such, web server 220 may consider the browsing behaviors of other users when determining the likelihood that a particular webpage will be the next webpage that will be requested by user device 210.

Relatedness to the current webpage may include how much a particular webpage relates to the webpage that the user is currently viewing. For example, the user may currently be viewing a webpage that includes a flight itinerary of airline tickets that the user is considering for purchase. Additionally, the webpage may include various hyperlinks for webpages that have different types of content. For instance, the webpage may include hyperlinks to webpages that are not particularly relevant to purchasing the airline tickets. Examples of such hyperlinks may include a Contact Us hyperlink for a webpage with contact information of the company hosting the website, a My Account hyperlink for a webpage that includes user information, etc.

The webpage may also include a Purchase Tickets hyperlink that the user may select in order to purchase the airline tickets corresponding to the itinerary provided in the webpage. While the webpage being viewed by the user may include multiple hyperlinks, web server 220 may determine that the webpage corresponding to the Purchase Tickets hyperlink is likely to be the next webpage requested by user device 210 (as opposed to, for example, the webpage of the Contact Us hyperlink) because the user is currently viewing a webpage that describes an itinerary for airline tickets that the user is considering for purchase.

In some implementations, web server 220 may determine the relevance on a prospective webpage by matching text (or other types of content) between the webpage currently being viewed by the user and a webpage that the user may request next. In some implementations, web server 220 may store information representing the relatedness between two webpage for later use. As such, web server 220 may consider the relatedness between the content of a webpage currently being viewed by a user and the content of another webpage when determining the likelihood of the other webpage being the next webpage requested by the user.

Hyperlink prominence may include the manner in which a hyperlink to another webpage is presented in a webpage that is currently being viewed by the user. For instance, the user of user device 210 may be completing an online job application that includes a sequence of webpages that each require the user to input different information. For instance, one webpage may prompt the user for personal information (e.g., name, address, telephone number, etc.), another webpage may prompt the user for job history information, another webpage may prompt the user for education information, etc.

After the user completes each webpage, the user may select a Next button to navigate to the next webpage in the job application. The Next button on each webpage may include the word "NEXT" in a large font and may be positioned in a prominent location, such as directly below textboxes or other features on the webpages for submitting information. Additionally, the Next button on each webpage may be larger than other hyperlinks presented on the webpages. As such, while the webpage may include hyperlinks to other webpages (e.g., a Contact Us hyperlink, a Home hyperlink, etc.), web server 220 may determine that the webpage corresponding to the Next button will likely be the next webpage requested by user device 210 because of the prominence of the Next button within the webpage currently being viewed by the user.

Data retrieval latency may include an estimation of the amount of time that would be required to retrieve information required by a particular webpage. In addition to determining the likelihood that a particular webpage will be the next webpage requested by user device 210, web server 220 may determine the value of preprocessing a webpage based on how long with would likely take to process the webpage. For instance, if web server 220 determines that the next webpage that user device 210 will likely request is a simple webpage that requires very little data retrieval and processing, the value of preprocessing the webpage may be relatively low because it is unlikely that waiting to do so in response to an actual request from user device 210 will result in any performance delays. By contrast, if web server 220 determines there is a reasonable chance that user device 210 will request a webpage with complex data structures that may take a while to retrieve from multiple external systems 230, the value of preprocessing the webpage may be relatively high because it is likely that waiting to do so in response to a request from user device 210 will result in performance delays. As such, web server 220 may consider the potential for delays or other difficulties in retrieving webpage information when determine the value of preprocessing a webpage.

Required system resources and available system resources may include the system resources that would be required to preprocess a webpage relative to the currently available system resources. For instance, when the available system resources of web server 220 are abundant, the amount of system resources required to retrieve and store webpage information may be irrelevant to the value of preprocessing the corresponding webpage. However, when system resources are scarce, web server 220 may decrease the value of preprocessing a webpage that includes large data structures that would require significant a lot of memory capacity for storage. By contrast, the value of preprocessing a webpage that includes smaller data structures may be unaffected by a scarcity of available system resources. As such, when determining the value of preprocessing a webpage, web server 220 may consider system resources that are currently available to web server 220 and the system resources that would be required to preprocess the webpage.

Web server 220 may implement a preprocessing valuation algorithm in order to determine the value of preprocessing a webpage. The preprocessing valuation algorithm may include various logical rules, conditions, triggers, and/or exceptions in order to enable web server 220 to intelligently allocate system resources to making webpages readily accessible to user device 210. The value of preprocessing a webpage may include a numeric value representing the anticipated benefit, from a system performance perspective, of processing the webpage before the webpage is actually requested by user device 210. The value of preprocessing a particular webpage may be used by web server 220 to determine whether the webpage is sufficiently valuable to undergo preprocessing. FIG. 7, as discussed below, provides an example of thresholds and conditions that may be applied by web server 220 to determine whether the value of preprocessing a webpage is sufficiently high to undergo preprocessing.

FIG. 7 is a diagram of a table representing example rules, thresholds, and conditions for determining whether to preprocess a webpage. As shown, the table may include a horizontal axis representing system resource usage that ranges from 0% to 100% and a vertical axis representing an index of webpage preprocessing values that range from 0 to 10. The rules, thresholds, and conditions represented in FIG. 7 may be implemented by web server 220.

Generally speaking, web server 220 may implement a relatively liberal preprocessing policy, so long as there is ample storage capacity. For instance, as illustrated in FIG. 7, web server 220 may preprocess webpages, regardless of the value of preprocessing the webpages, so long as system resources usage remains at or below 30%. After system resources usage exceeds 30%, web server 220 may implement a preprocessing threshold, whereby the value of preprocessing a webpage must be at or above a particular value (e.g., at least 3, when the system resources usage is at 30%) in order to be preprocessed by web server 220.

As depicted, the preprocessing threshold and the system resources usage may continue to increase such that additional webpages must have a progressively higher value in order to be preprocessed by web server 220. Additionally, in this example, a threshold for implementing preprocessing competition may increase nonlinearly as system resource usage increases above 30%. In some implementations, however, the threshold for implementing storage competition may remain the same (e.g., independent of system resources usage) and/or may vary in a manner that is linear.

In some implementations, while not explicitly shown in FIG. 7, the preprocessing threshold may also, or alternatively, be affected by other factors, such as the average value of webpages that have been preprocessed and are stored by web server 220. For example, if the average value of the webpages is above a certain value, the preprocessing threshold, for preprocessing additional webpages, may increase. Additionally, or alternatively, some of the webpages that were stored locally while the system resources usage was below 30% may have a value that is much lower than webpages that are preprocessed and stored after the system resources usage is above 50%. As such, if and when once system resources usage exceeds 80%, web server 220 may implement a preprocessing competition policy.

Under the preprocessing competition policy, preprocessed webpages may be stored locally by web server 220 so long as the new webpages exceed the preprocessing threshold. In addition, web server 220 may identify the preprocessed and store webpages with the lowest values and may remove the identified webpages if the value of the identified webpages does not exceed the current preprocessing threshold. In scenarios where the new webpages are much larger in size than the webpages with the lowest values, web server 220 may perform the same check on the preprocessed and stored webpages with the second lowest value, third lowest value, and so on, until the amount of preprocessed webpage information that is removed (e.g., deleted from storage) is approximately the same as the high-value media content that is now being preprocessed and stored by web server 220.

Implementing a preprocessing competition policy may enable high-value webpages to be preprocessed and stored by web server 220 without increasing the preprocessing threshold or the system resources usage until the webpages with the lowest value exceeds the preprocessing threshold. Over time, the value of the preprocessed and stored webpages may continue to increase until the maximum system resources is reached. Accordingly, web server 220 may implement a variety of rules, policies, thresholds, and triggers in order to dynamically manage media content and local storage capacity.

Figure 8:
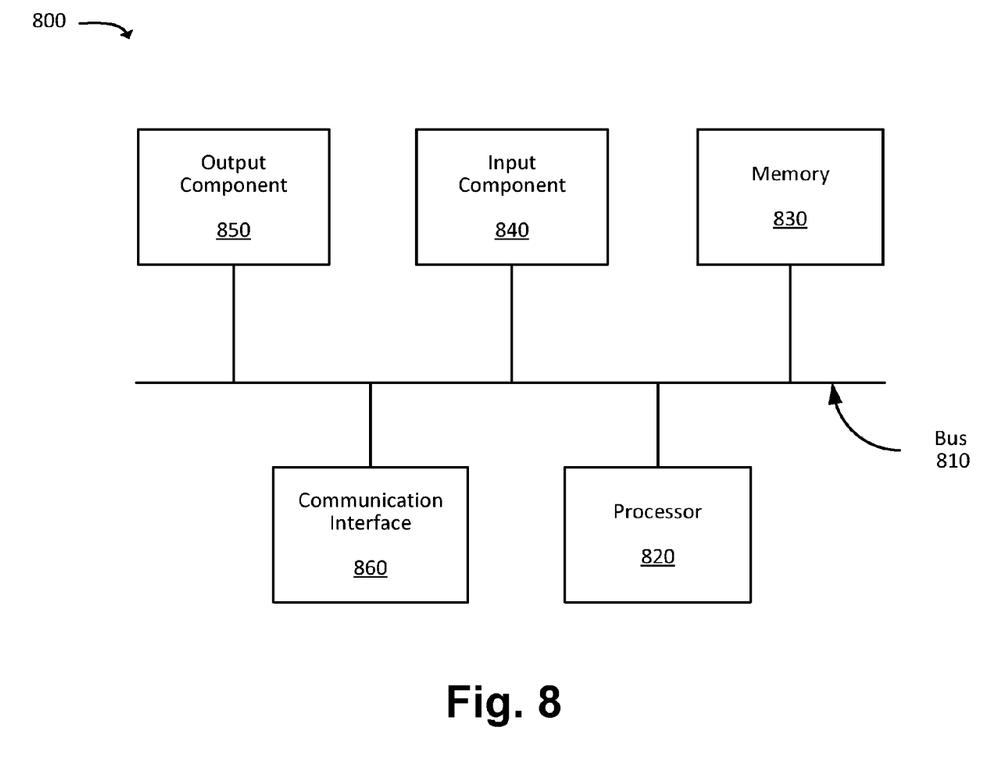
FIG. 8 is a diagram of example components of a device.

FIG. 8 is a diagram of example components of a device 800. Each of the devices illustrated in FIGS. 1, 2, and 4 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 1, 3, 4, and 6 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a server device, comprising:
providing, by the server device, a first webpage to a user device;
determining, by the server device, an availability of system resources of the server device;

determining, by the server device, based on the first web page, a plurality of second webpages that the user device is likely to request next;
determining, by the server device, a probability, for each second webpage of the plurality of second webpages, to be subsequently requested by the user device;
for each second webpage, of the plurality of second webpages, with the probability above a probability threshold,
  verifying, by the server device, whether the second webpage requires information that is particular to the user device so as not to be reusable for webpage requests from other user devices;
  when the second webpage is reusable for the webpage requests from the other user devices,
    causing, by the server device, the second webpage to be cached at the server device prior to a request for the second webpage;
  when the second webpage is not reusable for the webpage requests from the other user devices,
    obtaining, by the server device and prior to the request for the second webpage, a content corresponding to the information that is particular to the user device based on the availability of system resources;
    receiving, by the server device, the request from the user device for the second webpage; and
    using, by the server device, the content to provide the second webpage to the user device.

2. The method of claim 1, further comprising:
prior to obtaining the content,
verifying, based on the availability of system resources, that there are adequate system resources available to obtain the content prior to the request for the second webpage.

3. The method of claim 2, wherein verifying that there are adequate system resources available includes:
determining a likelihood of the user device requesting the second webpage next; and
determining whether to obtain the content based on the likelihood of the user device requesting the second webpage next and the availability of system resources.

4. The method of claim 3, wherein determining the likelihood of the user device requesting the second webpage next includes evaluating at least one of:
browsing patterns of a user of the user device,
browsing patterns of other users,
a relevancy of the second webpage to the first webpage,
a prominence of a hyperlink, to the second webpage, in the first webpage,
an expected latency from retrieving the content in response to the request for the second webpage, or
an amount of system resources that would be required to obtain the content relative to the availability of system resources.

5. The method of claim 1, further comprising:
determining, based on the first webpage, a task undertaken by a user of the user device,
wherein determining the second webpage that the user device is likely to request next is based on the task undertaken by the user.

6. The method of claim 1, wherein obtaining the content includes receiving the content from an external server in response to communicating a request to the external server for the content.

7. The method of claim 1, wherein the content includes information associated with a user profile of a user of the user device.

8. The method of claim 1, further comprising:
prior to receiving the request for the second webpage,
determining a third webpage that the user device is likely to request after the second webpage, the third webpage including additional content that is not cached by the server device;
obtaining the additional content; and
caching the additional content.

9. A server device, comprising:
a non-transitory memory device storing a plurality of processor-executable instructions; and
a processor configured to execute the processor-executable instructions, wherein executing the processor-executable instructions causes the processor to:
  provide a first webpage to a user device;
  determine an availability of system resources of the server device;
  determine, based on the first web page, a plurality of second webpages that the user device is likely to request next;
  determine a probability, for each second webpage of the plurality of second webpages, to be subsequently requested by the user device;
  for each second webpage, of the plurality of second webpages, with the probability above a probability threshold;
    verify whether the second webpage requires information that is particular to the user device so as not to be reusable for webpage requests from other user devices;
    when the second webpage is reusable for the webpage requests from the other user devices,
      cause the second webpage to be cached at the server device prior to a request for the second webpage;
    when the second webpage is not reusable for the webpage requests from the other user devices,
      obtain, prior to the request for the second webpage, a content corresponding to the information that is particular to the user device based on the availability of system resources;
      receive the request from the user device for the second webpage; and
      use the content to provide the second webpage to the user device.

10. The server device of claim 9, wherein executing the processor-executable instructions causes the processor to:
prior to obtaining the content,
verify, based on the availability of system resources, that there are adequate system resources available to obtain the content prior to the request for the second webpage.

11. The server device of claim 10, wherein, to verify that there are adequate system resources available, the processor-executable instructions causes the processor to:
determine a likelihood of the user device requesting the second webpage next; and
determine whether to obtain the content based on the likelihood of the user device requesting the second webpage next and the availability of system resource.

12. The server device of claim 11, wherein, to determine the likelihood of the user device requesting the second webpage next, the processor-executable instructions causes the processor to evaluate at least one of:
browsing patterns of a user of the user device,
browsing patterns of other users, a relevancy of the second webpage to the first webpage,
a prominence of a hyperlink, to the second webpage, in the first webpage,
an expected latency from retrieving the content in response to the request for the second webpage, or
an amount of system resources that would be required to obtain the content relative to the availability of system resources.

13. The server device of claim 9, wherein executing the processor-executable instructions causes the processor to:
determine, based on the first webpage, a task undertaken by a user of the user device,
wherein, the processor-executable instructions causes the processor to determine the second webpage that the user device is likely to request next based on the task undertaken by the user.

14. The server device of claim 9, wherein, to obtain the content, the processor-executable instructions causes the processor to:
receive the content from an external server in response to communicating a request to the external server for the content.

15. The server device of claim 9, wherein the content includes information associated with a user profile of a user of the user device.

16. The server device of claim 9, wherein executing the processor-executable instructions causes the processor to:
prior to receiving the request for the second webpage,
determine a third webpage that the user device is likely to request after the second webpage, the third webpage including additional content that is not cached by the server device;
obtain the additional content; and
cache the additional content.

17. A non-transitory computer-readable medium, storing processor-executable instructions, which, when executed by one or more processors of a computing device, cause the one or more processors to:
provide a first webpage to the user device;
determine an availability of system resources of the server device;
identify, based on the first webpage, a plurality of second webpages that the user device is likely to request next;
determine a probability, for each second webpage of the plurality of second webpages, to be subsequently requested by the user device;
for each second webpage, of the plurality of second webpages, with the probability above a probability threshold,
verify whether the second webpage requires information that is particular to the user device so as not to be reusable for webpage requests from other user devices;
when the second webpage is reusable for webpage requests from other user devices,
cause the second webpage to be cached at the server device prior to a request for the second webpage,
when the second webpage is not reusable for the webpage requests from other user devices,
obtain webpage content, corresponding to the information that is particular to the user device, for the second webpage based on the availability of system resources prior to the request for the second webpage;
receive the request, from the user device, for the second webpage corresponding to the webpage content; and
provide the second webpage, along with the webpage content, to the user device.

18. The non-transitory computer-readable medium of claim 17, wherein, to determine the probability for each second webpage of the plurality of second webpages, the processor-executable instructions causes the one or more processors to evaluate at least one of:
browsing patterns of a user of the user device,
browsing patterns of other users,
a relevancy of each second webpage, of the plurality of second webpages, to the first webpage,
an expected latency from retrieving the second webpage content in response to the request for the second webpage, or
an amount of system resources that would be required to obtain the second webpage content relative to the availability of system resources.

19. The non-transitory computer-readable medium of claim 17, wherein, to obtain the webpage content, the processor-executable instructions causes the one or more processors to:
receive the webpage content from an external server in response to communicating a request to the external server for the webpage content.

20. The non-transitory computer-readable medium of claim 17, wherein the webpage content includes information associated with a user profile of a user of the user device.

* * * * *